United States Patent [19]

Mentesh

[11] Patent Number: 5,133,618
[45] Date of Patent: Jul. 28, 1992

[54] ROD END JOINT

[75] Inventor: Ibrahim Mentesh, Roseville, Calif.

[73] Assignee: ICI Ceramics, Inc., Auburn, Calif.

[21] Appl. No.: 640,327

[22] Filed: Jan. 11, 1991

[51] Int. Cl.$^5$ .......................... F16B 13/06; F16B 7/04
[52] U.S. Cl. .................... 403/369; 403/374; 403/409.1; 403/30; 411/55
[58] Field of Search ............ 403/374, 367, 370, 409.1, 403/314, 369, 408.1, 406.1, 310, 30, 28; 411/55, 60, 61

[56] References Cited

U.S. PATENT DOCUMENTS

| | | | |
|---|---|---|---|
| 1,880,375 | 10/1932 | Davis, Jr. ...................... | 403/370 X |
| 2,469,349 | 5/1949 | Zeidler .................... | 411/57 |
| 2,508,039 | 5/1950 | Neuwirth .................... | 403/369 X |
| 2,544,712 | 3/1951 | Miller ........................ | 403/369 |
| 2,999,706 | 9/1961 | Wilcox ...................... | 403/370 |
| 3,492,032 | 1/1970 | Deike ........................ | 403/369 |
| 3,812,756 | 5/1974 | Wenger . | |
| 4,174,008 | 11/1979 | Preziosi et al. . | |
| 4,287,807 | 9/1981 | Pacharis et al. .............. | 411/42 |
| 4,470,735 | 9/1984 | Salisbury .................... | 411/353 |
| 4,494,347 | 1/1985 | Uhlig ........................ | 411/44 X |
| 4,815,360 | 3/1989 | Winterle .................... | 403/374 X |
| 4,854,793 | 8/1989 | Ollivier et al. .............. | 411/55 X |
| 4,865,246 | 9/1989 | Miyanaga ................... | 411/55 X |
| 4,898,505 | 2/1990 | Froehlich ................... | 411/55 |
| 4,919,579 | 4/1990 | Miyanaga ................... | 411/55 |
| 4,927,308 | 5/1990 | DiMarco et al. ............. | 411/437 |

FOREIGN PATENT DOCUMENTS

| | | | |
|---|---|---|---|
| 1019693 | 1/1953 | France .................... | 411/55 |
| 2022756 | 12/1979 | United Kingdom ........... | 411/55 |

Primary Examiner—Peter M. Cuomo
Attorney, Agent, or Firm—Thomas J. Greer, Jr.

[57] ABSTRACT

A joint for connecting a tip member to the end of a rod or shaft. The joint is particularly useful for joining a rod end to a tip member of a material which is not easily brazed, cemented or otherwise adhesively joined together. In the specific example described, a ceramic tip is jointed to the end of a metal rod, such as in a plug, a globe, or sliding stem valve. A cavity in the interior of the tip member has a narrowed opening at its top which terminates at a flat surface of the tip member. A pair of wedge members, each of about 180 degrees annular extent, and the headed bolt end are all located in the cavity, with the wedge members oppositely positioned around bolt head. The bolt head and wedge members have complementary tapers so that motion of the bolt away from the tip member cavity causes the wedge members to move radially away from each other and preferably contact the side wall of the cavity, with the cavity being partially closed by an annular overhang through which the bolt shank passes. The other end of the bolt is threaded and is received by a threaded hole in the end of the rod. The face of the rod is in surface contact with the surface of the tip member.

8 Claims, 1 Drawing Sheet

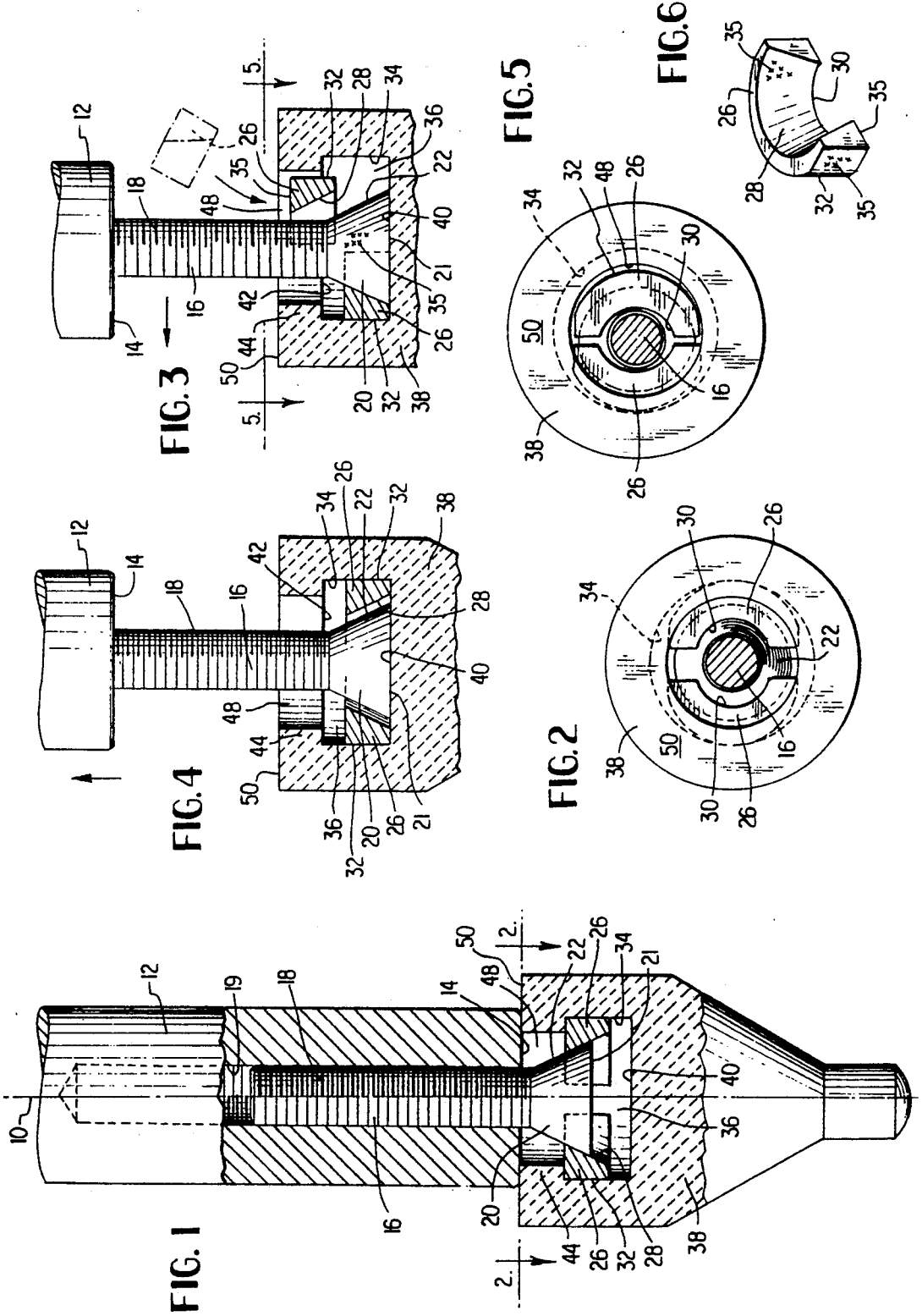

ROD END JOINT

BACKGROUND OF THE INVENTION

This invention relates to the art of rod couplings, and more particularly to a coupling for attaching a member to the end of a shaft.

The prior art is aware of constructions for attaching a hub member to a shaft end. For example, a sleeve may be threaded partially onto a shaft end, with the other sleeve end engaged with a hub member projection. In the case of joining a metal shaft to a non-metal member, various adhesives may be employed. However, when the tip member is fashioned from a ceramic material, for example, the use of adhesives sometimes presents difficulties in obtaining a durable joint. Additionally, whenever repair or replacement of the tip member is desired, an adhesive joint must often be destroyed and the joined elements cleaned and carefully prepared prior to replacement. This can be time consuming, especially where the joint is used in a dirty or corrosive environment and cleaning and replacement are even more difficult. Apart from ceramic tip members, tips fashioned of other materials which may not be easily brazed or cemented are sometimes desired to be joined to a shaft or rod end.

SUMMARY OF THE INVENTION

According to the practice of this invention, the tip member to be joined to a shaft end is so configured that a firm, durable and relatively rapid connection can be made and which is readily disconnectable. The connection is independent of the materials from which the tip member and shaft are constructed. This permits various types of tip members to be joined, it being only necessary that both the shaft and the tip member are fashioned from a rigid material. The shaft end is provided with a threaded opening for receiving the threaded end of a bolt having a conical, enlarged head. The tip member to be joined is provided with a cavity in its interior, with a shoulder overhang opening defining the entrance to the cavity. Wedge members, defined by two separate, substantially semicircular elements each provided with a part conical surface, are positioned within the cavity and in contact with the conical head of the bolt. The taper of the wedge members is generally complementary to the taper of the bolt head. The wedge taper is the same as the bolt head taper in the specific embodiment to be described, however, this exact correspondence of tapers is not essential. The bolt is threaded towards the shaft with the result that the wedge members are urged radially outwardly and engage the sides of the cavity as well as the interior, bottom surface of the shoulder overhang of the cavity. The rod end abuts the tip member and the bolt is under some tension. The construction yields a durable joint displaying continuous resistance to longitudinal stresses or vibrations, as are often encountered with a valve for example.

A typical application of the joint is with a valve wherein the tip member is a valve plug which moves up and down to alternately open and close a valve opening.

BRIEF DESCRIPTION OF THE DRAWINGS

FIG. 1 is a partial longitudinal cross-sectional view of the joint of this invention.

FIG. 2 is a view taken along Section 2—2 of FIG. 1.

FIG. 3 is a view similar to FIG. 1 showing the placement of the wedge members into the tip member cavity.

FIG. 4 is a view similar to FIG. 3 and illustrates the several joint elements prior to formation of the joint.

FIG. 5 is a view taken along Section 5—5 of FIG. 3.

FIG. 6 is a perspective view of a wedge member shown upside down from that of the other views of the wedge members.

DETAILED DESCRIPTION OF THE INVENTION

Referring now to the drawings, the longitudinal axis of the joint is denoted as 10 and extends through a shaft 12, the latter typically of metal, ceramic, or other rigid material, with axis 10 being coincident with the longitudinal axis of the shaft. The shaft end is denoted as 14 and is at right angles to axis 10. A bolt 16, typically of metal, has threads 18 on one end and is received by rod coaxial threaded aperture 19 which opens on surface 14. The bolt is provided with an enlarged head 20 having a conical surface 22 of about 45 degrees. Each of a pair of substantially semicircular wedge members 26, typically of metal, has a conical surface 28 complementary to surface 22 extending between its two parallel, upper and lower surfaces thereof, with each wedge member having an inner periphery 30 and an outer periphery 32, these peripheries defining an opening through each wedge.

Each wedge is slightly less than 180 degrees in annular extent, and the outer periphery 32 of each is at least partially engaged with a portion of side wall 34 of a cavity 36 in a tip member 38. The latter may be, for example, fashioned from a ceramic material. Cavity 36 is annular and is defined by a bottom wall 40, annular side wall 34, and a top wall 42, the latter defined by the lower surface of an annular, overhanging shoulder portion 44 of the tip member. An opening 48 defined by shoulder portion 44 communicates with cavity 36 and opens onto annular surface portion 50 of the tip member. Shoulder opening 48 is of a diameter greater than the maximum diameter of bolt head 20. In the case of a ceramic tip member, cavity 36 may be formed by conventional methods either prior to or after firing and/or sintering of the ceramic material.

To assemble the elements illustrated, referring now also to FIGS. 2-6, bolt head 20 is placed into cavity 36 so that the lower, flat portion 21 of the head contacts bottom wall 40 of the cavity. Then each wedge member 26 is placed, sequentially, around the shank of the bolt and manipulated down into cavity 36. FIG. 3 shows one wedge member already placed in the cavity and the other wedge being inserted from a dashed line position, the bolt having been moved to the left as indicated by the horizontal arrow to make room for insertion of the other (right hand) wedge as shown at FIG. 5. The outer diameter of each wedge member is preferably somewhat less than the diameter of opening 48, as may be seen at FIG. 5. Wedges 26 are now resting on bottom surface 40 and on bolt head 20, or only on bottom surface 40 as shown in FIG. 4.

The end of the bolt is now partially threaded into bore 19 of shaft 12 by manually grasping and turning the bolt relative to the shaft. Or, the bolt may be grasped and the shaft rotated to effect partial threading into the shaft bore. The rod is now pulled upwardly, as shown by the arrow of FIG. 4, or alternatively the tip member is pulled down, so as to place a tension on the bolt. Conical surfaces 28 of the wedge members come into surface engagement with conical surface 22 of the bolt head as the latter rises, and the upper surfaces of the wedges are pulled up into surface contact with the interior of top annular shoulder wall 42. Bolt 16 is now screwed further into threaded opening 19 by turning tip member 38 relative to the shaft while maintaining tension between the shaft and the tip member. The tension between the rod and the tip member during this relative rotation permits the bolt to be threaded all the way into rod opening 19, i.e., there is no relative rotation during this time (within the cavity) between the wedges, the bolt head, and the tip member. Rotation of the tip member thus results in rotation of the bolt.

The final phase of this rotation causes a wedging action, with conical surface 22 of head 20 forcing wedge members 26 radially outwardly so that their peripheral portions 32 engage annular side wall 34 of cavity 36. Also, the upper surfaces (as viewed in FIG. 1) of the wedge members engage upper annular surface 42 defined by shoulder overhang 44. When the joint is complete, surfaces 14 and 50 are in surface contact and firmly abut each other, thus providing a durable joint or connection between shaft 12 and tip member 38. By virtue of the generally complementary taper of bolt head conical surface 22 and conical surfaces 28 of the wedge members, any minor variations in dimensions between the two wedges 26 of any one joint, or pairs of wedges of a plurality of such joints, is automatically compensated for. Namely, the head 20 will move either a little farther axially out of recess 36 or remain a little farther axially in the recess upon completion of the joint. Further, the compression of shoulder overhang portions 44 of the ceramic tip strengthens the tip at this region, i.e., this region is prestressed.

The cavity 36 is shown as centrally located in tip member 38. For the practice of this invention, it is only necessary that recess or cavity 36 have an opening 48 and an overhang 44, and that surfaces 14 and 50 abut each other.

The tension in bolt 16 in the final assembly of FIG. 1 assists in preventing vibrations from causing looseness of the joint. Further, relative rotation of the bolt in the threaded opening 19 after final joint assembly may be prevented by a variety of known techniques, such as cross pinning and by passing a locking pin though a small hole in shaft 12 and bolt 18. Or, a hole may be drilled partially through shaft 12 to expose a portion of threads 16, which portion can then be deformed by impact to prevent rotation. While two wedge members have been shown, it will be apparent that three or more wedge members may be employed. Further, the wedge members may be of a relatively rigid plastic or elastomeric material, as well as of metal. The cavity, the bolt head, opening 48, and the wedges have been shown and described as annular, i.e., curved. It will be apparent, however, that a joint having the same characteristics may be obtained if these elements are rectangular in form. Namely, recess 36 can have four side walls, with opening 48 rectangular, with a four sided, tapered bolt head cooperating with straight, tapered wedge elements. Further, surfaces 14 and 15 need not be flat. They may be for example provided with complementary ribs and grooves. Still further, surface 14 need not be orthogonal to the longitudinal axis of the shaft.

With a ceramic tip 38 of average surface roughness and with fairly smooth surfaces on metal bolt head 20 and on the metal wedges, the illustrated elements of the joint are assembled as described. However, if the ceramic is very smooth and if the bolt head and wedge members are also very smooth, or if a smooth hard plastic is used as the material of construction, then knurling 35 (shown only at FIGS. 3 and 6) may be used to yield the necessary friction between the elements to permit joint assembly as described, i.e., placing tension between the shaft and the ceramic tip while relatively rotating them. Such knurling is indicated by several crosses on the surface of bolt head 20 and on surfaces 28 and 32 of the wedge members, and is generally indicated by a lead line on the upper surface of the wedge members and surface 42 of shoulder overhang 44. The character and extent of the knurling will depend on the smoothness/roughness of the surfaces involved. In the case of a rectangular bolt head, as described above, knurling will not be required to assure rotation of the bolt with rotation of the ceramic tip to effect joint assembly.

The description has shown the joint axis 10 as vertical and terms upper, lower, bottom and the like have been used here and in the claims to facilitate explanation of the invention, but are not intended to limit it to any particular orientation.

I claim:

1. A joint for coupling a rigid tip member to the end of a rigid shaft, the joint including a shaft having an end, a threaded, bolt-receiving hole opening to the shaft end, a headed threaded rigid bolt having one end thereof screwed into said shaft threaded hole, said bolt having an enlarged, flaring, tapered head at the other end thereof, a tip member having an end surface abutting said end of said shaft, said tip member having an internal cavity, the tip member having an integral shoulder overhand at its said surface which overhangs and partially closes said cavity and which forms an opening to the cavity from said tip member surface, the bottom of said overhand defining a surface which partially defines said cavity, said cavity having a side wall, a wedge member positioned within said cavity, said wedge member having a tapered surface in complementary surface contact with the tapered head of said bolt, said wedge member having an upper surface in at least partial surface contact with at least a portion of said shoulder overhand bottom surface, the bolt being under tension.

2. The joint of claim 1 wherein a portion of the wedge member is also in surface contact with a portion of the cavity side wall.

3. The joint of claim 2 wherein there are at least two of said wedge members.

4. The joint of claim 3 wherein the bolt head and the wedge members are knurled over at least a portion of their surface contact.

5. The joint of claim 2 wherein each wedge member is annular and not greater than 180 degrees in annular extent, the maximum diameter of the bolt head being less than the diameter of the overhang opening, the cavity side wall and the overhang opening being annular.

6. The joint of claim 2 wherein the bolt head is conical.

7. The joint of claim 1 wherein said tip member is formed of a ceramic material.

8. The joint of claim 1 wherein the taper of the bolt head is about 45 degrees.

* * * * *